US010580023B2

(12) United States Patent
Bostick et al.

(10) Patent No.: US 10,580,023 B2
(45) Date of Patent: Mar. 3, 2020

(54) EVENT ATTENDEE ORIGIN PREDICTION AND IMPACT ANALYSIS

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 864 days.

(21) Appl. No.: 14/934,661

(22) Filed: Nov. 6, 2015

(65) Prior Publication Data

US 2017/0132647 A1    May 11, 2017

(51) Int. Cl.
*G06Q 30/02* (2012.01)
*G06Q 50/00* (2012.01)

(52) U.S. Cl.
CPC ..... *G06Q 30/0205* (2013.01); *G06Q 30/0201* (2013.01); *G06Q 50/01* (2013.01)

(58) Field of Classification Search
None
See application file for complete search history.

(56) References Cited

U.S. PATENT DOCUMENTS

| 7,729,965 | B1* | 6/2010 | An | G06Q 30/02 |
| | | | | 702/194 |
| 8,768,867 | B1* | 7/2014 | Thaeler | G06Q 30/02 |
| | | | | 706/12 |
| 9,009,093 | B1 | 4/2015 | Omoigui | |
| 9,553,922 | B1* | 1/2017 | Guarraci | H04W 4/21 |
| 2010/0082374 | A1* | 4/2010 | Charania | G06Q 10/02 |
| | | | | 705/5 |
| 2010/0332282 | A1 | 12/2010 | Bradley et al. | |
| 2011/0208674 | A1 | 8/2011 | Mills et al. | |

(Continued)

OTHER PUBLICATIONS

Janeczko, Mules, Ritchie, Estimating the Economic Impacts of Festivals and Events: A research Guide, 2002, http://sustain.pata.org/wp-content/uploads/2015/02/Mules_EcoImpactsFestivals_v6.pdf (Year: 2002).*

(Continued)

*Primary Examiner* — Kurtis Gills
*Assistant Examiner* — Akosua Kyereme-Tuah
(74) *Attorney, Agent, or Firm* — William Hartwell; Andrew D. Wright; Roberts Mlotkowski Safran Cole & Calderon P.C.

(57) ABSTRACT

A computer-implemented method includes: obtaining, by a computing device, attendee origin indicators for an upcoming event by accessing a database or social media network; obtaining, by the computing device, attendee origin impact indicators; determining, by the computing device, a predicted number of attendees for the upcoming event by origin based on the attendee origin indicators; determining, by the computing device, an impact of hosting the attendees for the upcoming event based on the predicted number of attendees by origin and the attendee origin impact indicators; and outputting, by the computing device, information identifying the impact.

20 Claims, 5 Drawing Sheets

(56) References Cited

U.S. PATENT DOCUMENTS

| | | | |
|---|---|---|---|
| 2011/0252097 A1 | 10/2011 | Walker et al. | |
| 2013/0132194 A1* | 5/2013 | Rajaram | G06Q 30/0251 |
| | | | 705/14.52 |
| 2013/0318520 A1* | 11/2013 | Abuelsaad | G06F 9/44505 |
| | | | 717/177 |
| 2014/0267573 A1 | 9/2014 | Aziz | |
| 2014/0379390 A1 | 12/2014 | Scarborough | |
| 2015/0081276 A1* | 3/2015 | Gerard | G06F 17/2735 |
| | | | 704/9 |
| 2015/0170045 A1* | 6/2015 | Kirkham | G06Q 10/06 |
| | | | 706/11 |

OTHER PUBLICATIONS

Anonymous, "Disneyland Crowd Forecast Calendar, Is It Packed?", http://www.isitpacked.com/disneyland-crowd-forecast-predictor-calendar/, Accessed Apr. 29, 2015; 4 pages.

Du et al., Predicting Activity Attendance in Event-Based Social Networks: Content, Context and Social Influence, UBICOMP '14, Sep. 13-17, 2014, Seattle, WA, USA, pp. 425-434.

Holland, Tom, "Breaking News—The Real Economics of Cruise Ships", http://www.cruiseshipsinsavannah.com/breaking-news-the-real-economics-of-cruise-ships.html; Jan. 25, 2013, 2 pages.

* cited by examiner

EVENT ATTENDEE ORIGIN PREDICTION AND IMPACT ANALYSIS

BACKGROUND

The present invention generally relates to determining the origin of attendees for an event, and more particularly, to analyzing the impact on local infrastructure based on the origin of attendees for the event.

Large scale events such as professional sports games, popular shows/concerts, and conventions typically attract attendees from both the local area where the event is hosted, and visitors who reside elsewhere (e.g., non-locals). Local businesses and governments may attempt to adjust plans and/or resources to better accommodate attendees, particularly non-local attendees.

SUMMARY

In an aspect of the invention, a computer-implemented method includes: obtaining, by a computing device, attendee origin indicators for an upcoming event by accessing a database or social media network; obtaining, by the computing device, attendee origin impact indicators; determining, by the computing device, a predicted number of attendees for the upcoming event by origin based on the attendee origin indicators; determining, by the computing device, an impact of hosting the attendees for the upcoming event based on the predicted number of attendees by origin and the attendee origin impact indicators; and outputting, by the computing device, information identifying the impact.

In another aspect of the invention, there is a computer program product for determining the impact to a local infrastructure or economy when hosting an event. The computer program product includes a computer readable storage medium having program instructions embodied therewith. The program instructions executable by a computing device to cause the computing device to: obtain attendee origin indicators for an upcoming event by accessing a database or social media network, the attendee origin indicators identifying the origin of attendees who previously attended a similar event as the upcoming event; obtain attendee origin impact indicators indicating the impact that attendees of various origins had on the local infrastructure or economy; determine a predicted number of attendees for the upcoming event by origin based on the attendee origin indicators; determine an impact of hosting the attendees for the upcoming event based on the predicted number of attendees by origin and the attendee origin impact indicators; and output information identifying the impact and the predicted number of attendees for the upcoming event by origin.

In another aspect of the invention, there is a system including a CPU, a computer readable memory and a computer readable storage medium associated with a computing device. The system includes: program instructions to obtaining attendee origin indicators for an upcoming event by accessing a social media network; program instructions to obtaining attendee origin impact indicators; program instructions to determine a predicted number of attendees for the upcoming event by origin based on the attendee origin indicators; program instructions to determine confidence score indicating the reliability or accuracy of the predicted number of attendees for the upcoming event by origin; program instructions to determine an impact to a local economy or infrastructure of hosting the attendees for the upcoming event based on the predicted number of attendees by origin and the attendee origin impact indicators; program instructions to output information identifying the impact to planning personnel of impacted business or infrastructure. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to predicting the origin of attendees for an event, and more particularly, to analyzing the impact on local infrastructure based on the origin of attendees for the event. In accordance with aspects of the present invention, the origin of attendees for an event (e.g., a concert, a sports event, a convention, etc.), is predicted in order to determine the impact that hosting the attendees will impact local infrastructure (e.g., local governments, roadways, public transit, businesses, etc.). For example, non-local attendees (e.g., attendees that live greater than a threshold distance from the location of an event), are more likely to utilize certain products and services, such as lodging, restaurants, tourist attractions, interstate roadways, etc. Advantageously, aspects of the present invention determine an approximate number of non-local attendees planning to attend an event, determine regions from which these non-local attendees are visiting, and determine an impact that the non-local attendees may have on the local infrastructure/local economy.

In embodiments, various indicators and factors may be used to determine the number of non-locals planning to attend an event. For example, information from ticket sale sources (e.g., ticket sale databases) may identify the billing/resident address of attendees for an event. Further, publicly available information on social media networks may identify non-locals that are attending events. For example, individuals may indicate their plans to attend an event using social media networks (e.g., by responding to event invitations and/or by posting status updates or other information via social media networks indicating plans to attend an event). Individuals who have indicated their plans to attend an event may be determined to be "non-local" based on publicly available information identifying the individuals' hometown.

As described herein, historical event attendee origin indicators may also be used to determine attendee origins (e.g., the number of non-locals that are planning on attending an event). For example, the attend origin prediction may be based on the number of non-locals that previously attended a similar event in the past (e.g., events having the same participants, sports teams, bands, or events of the same type of convention, etc.). In embodiments, information identifying the number of non-locals that "checked in" to a similar event (e.g., using social media networks and/or other networks) may be used to predict the number of non-locals that may be planning on attending a similar future event.

Based on the above data, a report may be generated with confidence scores that identify a predicted number of attendees attending an event by origin and/or region attending the event (e.g., city and state, or a range of geographic coordinates), and confidence scores indicating the reliability of the prediction. In embodiments, the report may identify a number of locals and non-locals (e.g., individuals who reside greater than a threshold distance from the location of the event). Further, the report may identify the most popular regions from which attendees are traveling to attend the event. Also, historical impact of non-locals by region can be combined with the predicted number of non-locals attending an event to determine a predicted impact of the non-locals on local infrastructure.

In turn, local governments and/or businesses can better plan to accommodate attendees for an event, particularly non-local attendees. For example, local governments can ensure that certain roadways are available to non-locals (e.g., by postponing planned roadwork, opening shoulder lanes, etc.). Specifically, particular roadways can be made available to non-locals based on the origin of attendees. For example, if most of the attendees are traveling from the north of where an event is taking place, those roadways can be made available (e.g., free of construction/roadwork), whereas roadways to the south are less affected by traveling attendees. As another example, local governments may adjust transit times and increase the number of public transit trains available to accommodate non-local (and even local) attendees. As another example, private businesses, such as restaurants, etc., may better prepare to accommodate a larger number of visitors based on historical data identifying that visitors from particular regions prefer particular restaurants. In some embodiments, businesses may send promotions to non-locals of particular regions based on historical data indicating that these non-locals have historically patronized their business in the past.

As described herein, information may be obtained that identifies the actual number of non-locals that attended an event, versus the predicted number of non-locals that attended the event. The actual versus predicted data can be used to update the prediction techniques and to update the historical indicators used to predict the number of non-locals for future events.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

Figure 1:
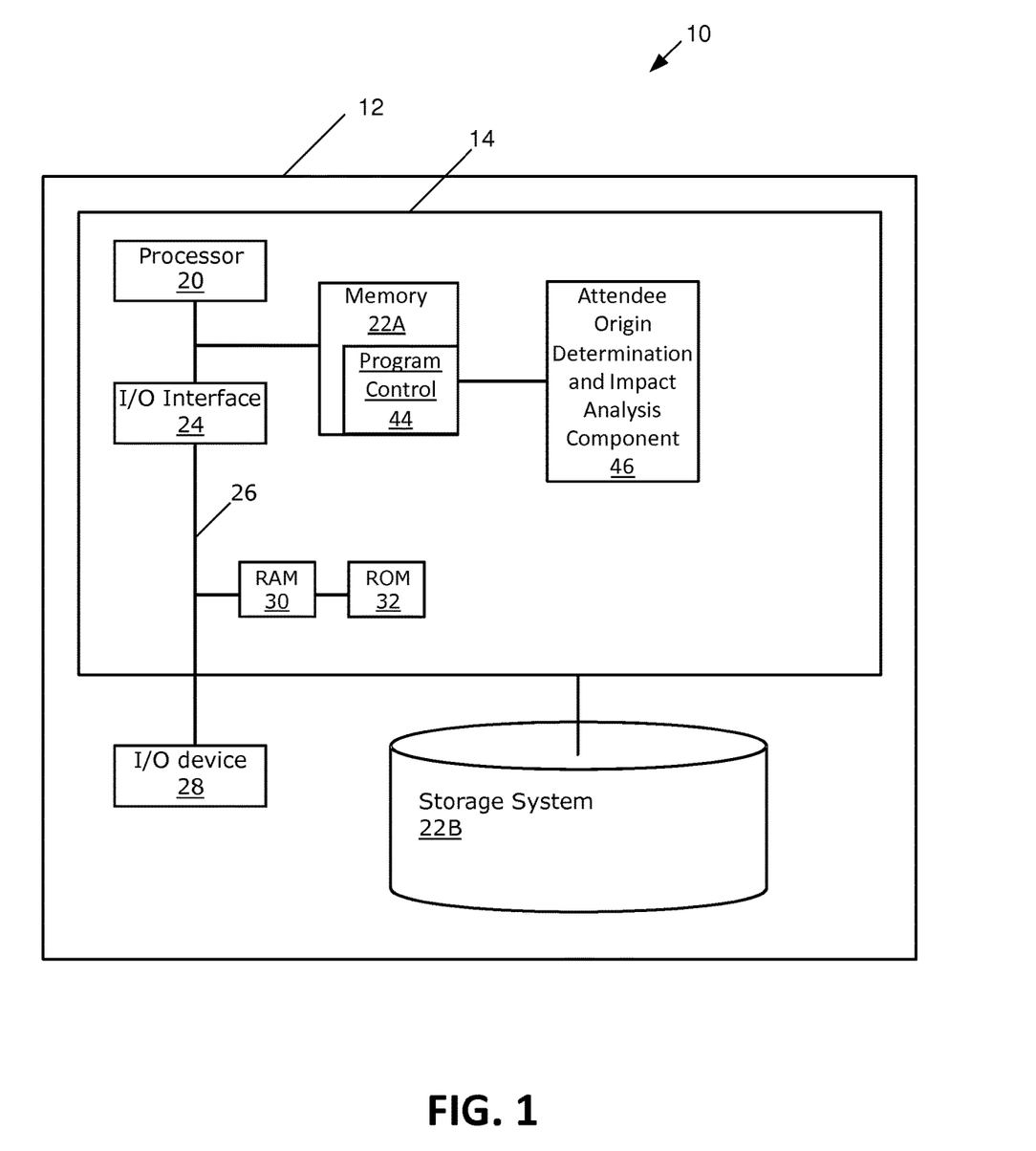
FIG. 1 an illustrative environment for implementing the steps in accordance with aspects of the invention.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM) 30, a read-only memory (ROM) 32, and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls an attendee origin determination and impact analysis component 46, e.g., the processes described herein. The attendee origin determination and impact analysis component 46 can be implemented as one or more program code in program control 44 stored in memory 22A as separate or combined modules. Additionally, the attendee origin determination and impact analysis component 46 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in computing device 14.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
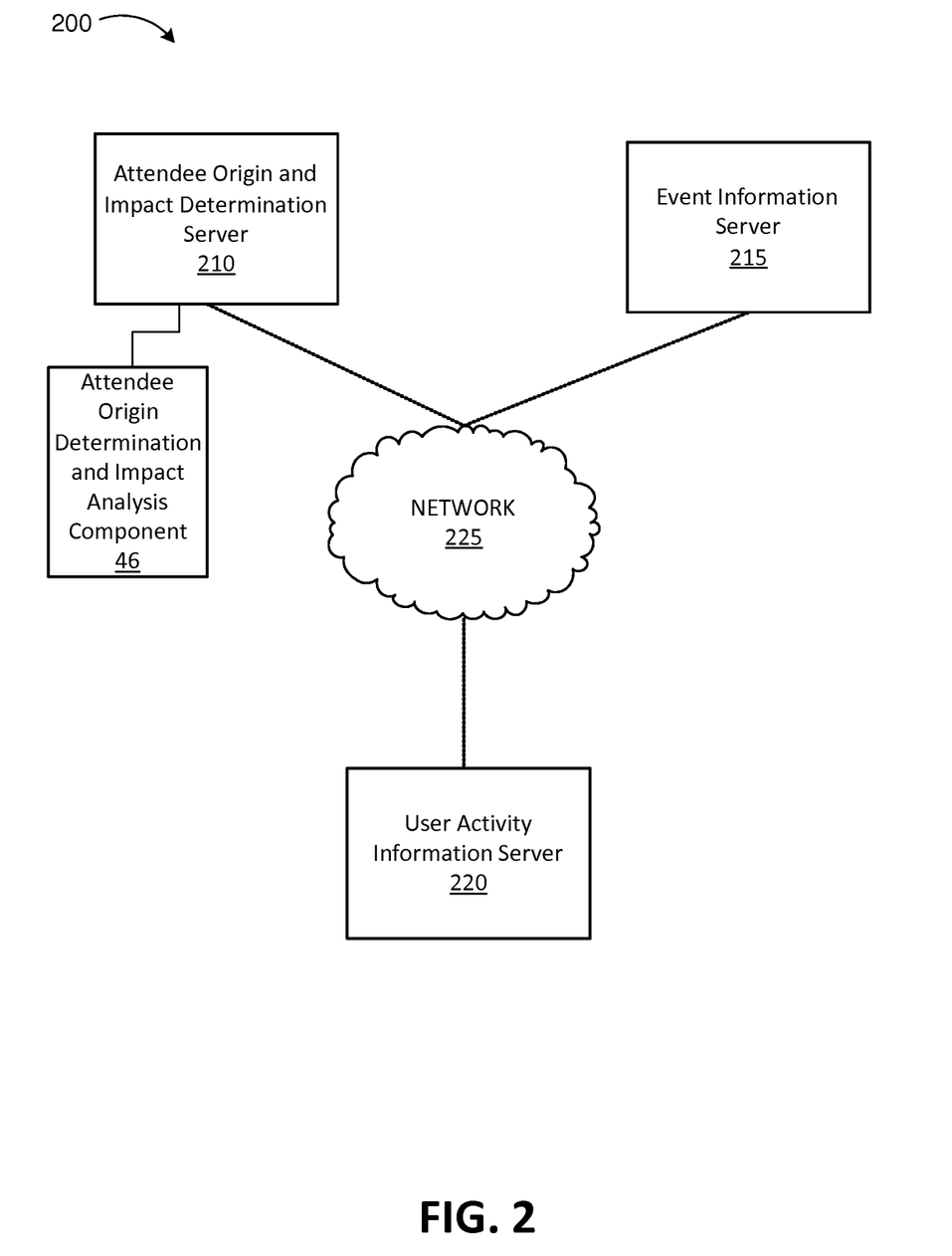
FIG. 2 shows an example environment in accordance with aspects of the present invention.
Figure 5:
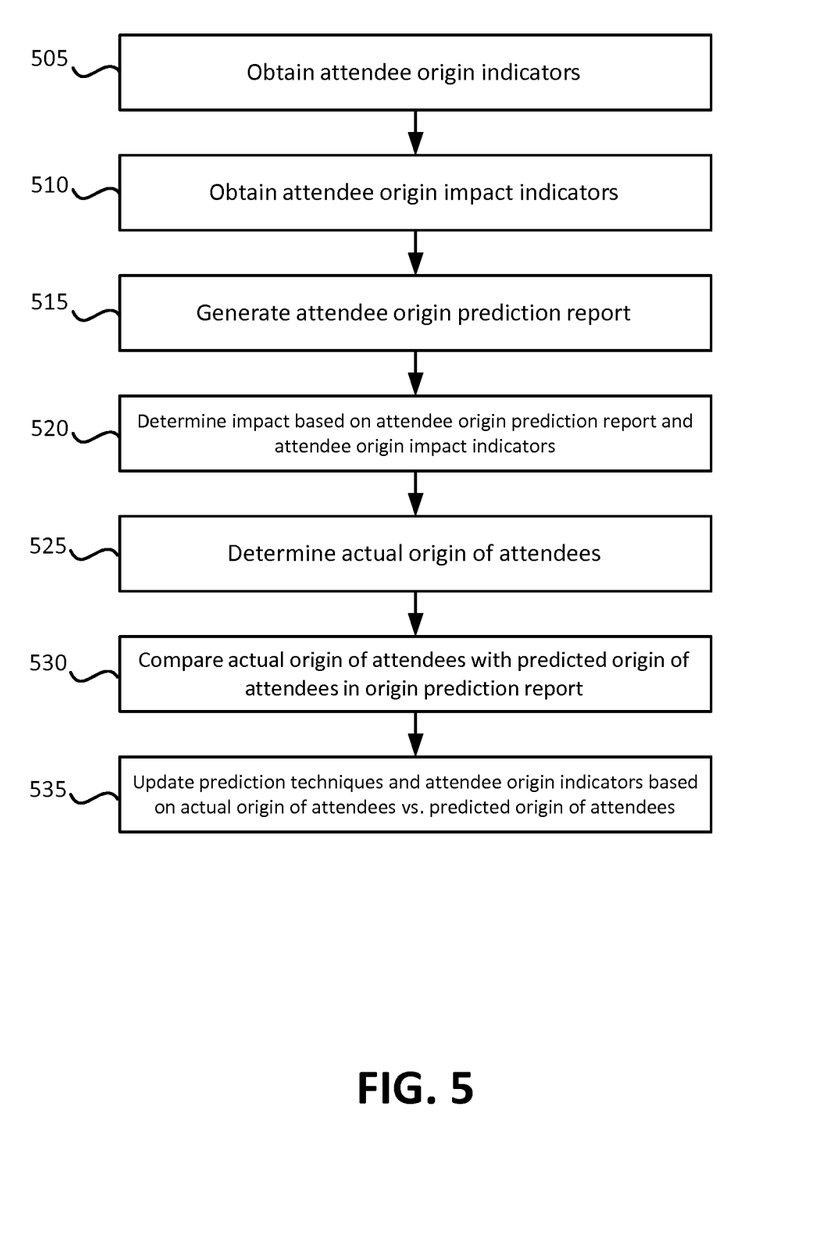
FIG. 5 shows an example flowchart for predicting the origin of attendees of an event, and analyzing the impact of local infrastructure based on the prediction in accordance with aspects of the present invention.

FIG. 2 shows an example environment in accordance with aspects of the present invention. As shown in FIG. 5, environment 200 may include an attendee origin and impact determination server 210, an event information server 215, user activity information server 220, and/or network 225. In embodiments, one or more components in environment 200 may correspond to one or more components in the cloud computing environment of FIG. 2.

The attendee origin and impact determination server 210 may include one or more computing devices (e.g., server 12 of FIG. 1) that determine the origins of attendees that plan on attending an event in a particular location. As described herein, the attendee origin and impact determination server 210 may include the attendee origin determination and impact analysis component 46 which may obtain information the event information server 215 and/or the user activity information server 220 that indicate the origins of the attendees. For example, the attendee origin and impact determination server 210 may receive information regarding ticket sales billing information (e.g., the ZIP codes revealing the origin of ticket sales purchasers), event invitation responses, public postings from users' social networking pages (e.g., status updates, comments, and/or other publicly posted messages), etc. Based on such information, the attendee origin and impact determination server 210 may determine the origin of attendees for an event hosted in a particular location. Also, the attendee origin and impact determination server 210 may determine the impact to local infrastructure based on the origin of the attendees, as described herein.

The event information server 215 may include one or more computing devices (e.g., server devices) that receive and/or store information regarding planned events in a particular location. For example, the event information server 215 may store information such as the type of the event (e.g., sports event, convention, concert, etc.), participants being featured in the event (e.g., athletes, musicians, speakers, entertainers, etc.), ticket sales information (e.g., billing information identifying the origin of ticket purchasers), etc.

The user activity information server 220 may include one or more computing devices (e.g., server devices) that receive and/or store information regarding user activity. In accordance with aspects of the present invention, the user activity information server 220 may provide user activity information indicating users that are planning on attending an event. For example, the user activity information server 220 may provide information regarding event invitation responses, public postings from users' social networking pages, etc. Also, the user activity information server 220 may provide information identifying the origin of users based on the users' published hometown or current town of residence.

The network 225 may include one or more wired and/or wireless networks. For example, the network 225 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 225 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 3:
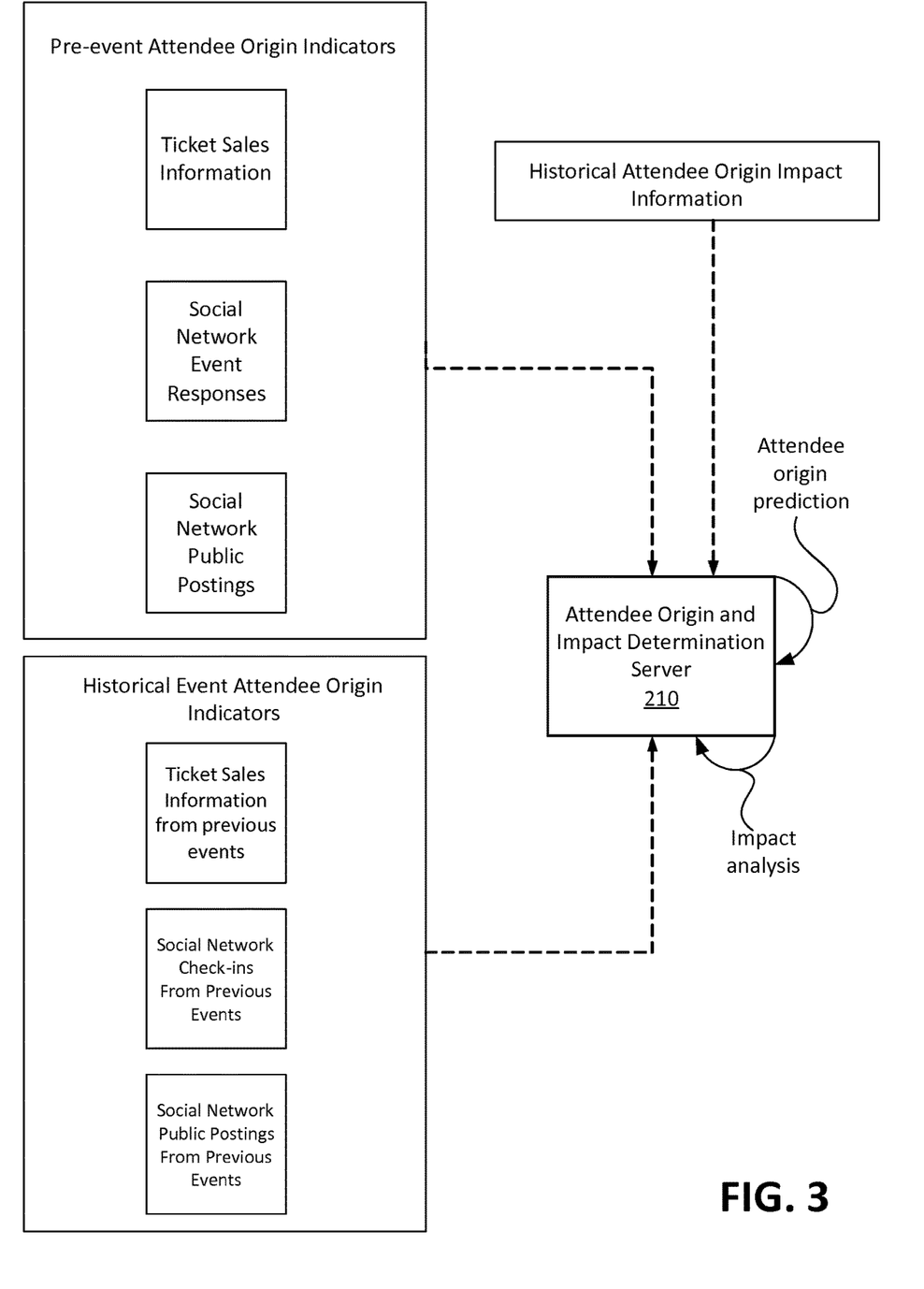
FIG. 3 shows a flow diagram of an example process for predicting the origin of attendees of an event, and analyzing the impact of local infrastructure based on the prediction in accordance with aspects of the present invention.

FIG. 3 shows a flow diagram of an example process for predicting the origin of attendees of an event, and analyzing the impact of local infrastructure based on the prediction in accordance with aspects of the present invention. As shown in FIG. 3, the attendee origin and impact determination server 210 may receive pre-event attendee origin indicators, historical event attendee origin indicators, and historical attendee origin impact information. The pre-event attendee origin indicators indicate the origin of attendees that are planning on attending a future event at a particular location. Based on the pre-event indicators, the attendee origin and impact determination server 210 may count the number of attendees planning on attending an event and may determine the origin for each attendee. Further, the attendee origin and impact determination server 210 may generate a report identifying a prediction for the number of attendees per region, and confidence scores indicating the reliability of the prediction. In embodiments, the pre-event indicators may include:

Ticket sales information. The ticket sales information may be received from the event information server 215, and may include information such as billing addresses of ticket purchasers. The billing addresses may be used to determine the origin of attendees planning on attending an event. The attendee origin and impact determination server 210 may count the number of attendees based on the ticket sales, and determine the origin of the attendees based on the billing addresses.

Social network event responses. The social network event responses may be received from the user activity information server 220, and may indicate the origin of attendees planning on attending an event. For example, a user may indicate, via a social networking system, that the user is planning on attending the event. From the user's publicly shared location of residence (e.g., a ZIP code or town name), the origin of each user that has indicated plans to attend the event to the event may be determined. The attendee origin and impact determination server 210 may count the number of event responses to determine the number of attendees and their origins. In embodiments, a response is counted only once per user to prevent multiple responses from the same user from being counted more than once. In embodiments, a response can be updated when a user initially indicates plans to attend an event, but later indicates that the user is no longer on planning to attend the event.

Social network public postings. The social network public postings may be received from the user activity information server 220, and may identify users that are planning on attending and event. For example, the public postings may be on users' publicly shared portions of the users' social networking profile, such as comments, status updates, wall posts, etc. In embodiments, the text in the public postings may indicate that users are planning on attending the event (e.g., "I can't wait to see Rock Band in Raleigh next month"). Natural language processing (NLP) techniques may be used to determine the likelihood that a given individual is planning on attending an event (e.g., a confidence score relating to the likelihood that the given individual is planning on attending the event). The attendee origin and impact determination server 210 may count the number of public postings indicating users' plans to attend and event. In embodiments, public postings indicating a user's plans on attending an event may only be counted once. For example, if a particular user makes several posts of plans to attend the event, the attendee origin and impact determination server 210 may only count one post for the user. If a user has responded to an event invitation and has also posted plans to attend the same event, only one of the event invitation responses or the posted plans may be counted by the attendee origin and impact determination server 210.

The pre-event indicators may include additional information not identified above.

The historical event attendee origin indicators may identify a number of attendees and the origin of the attendees that attended similar events as an upcoming event (e.g., events with similar participants, such as sports teams, convention types, entertainers, etc.). For example, the historical event attendee origin indicators may include:

Ticket sales from previous events. Information regarding the ticket sales from previous events may be received from the event information server 215 and/or previously stored by attendee origin and impact determination server 210. The information regarding the ticket sales may indicate the number of attendees and their origins who previously purchased tickets to a similar event as an upcoming event (e.g., events in the same location of the same type and featuring similar participants, such as athletes, teams, musicians, entertainers, etc.).

Social network check-ins from previous events. Information regarding the social network check-ins from previous events may be received from the user activity information server 220 and/or previously stored by attendee origin and impact determination server 210. The information regarding the social network check-ins from previous events may indicate the number of attendees and their origins who previously attended a similar event as an upcoming event. In embodiments, only one check-in per user may be counted so that multiple check-ins from the same user do not skew the data indicating the number of attendees, and origins of the attendees, attending the event. In embodiments, "check-ins" may refer to location-tagged status updates. As an example, social network check-ins can be obtained by querying the user activity information server 220 for check-ins at dates/times and locations corresponding to a previous event. A confidence level may be assigned based on the likelihood that given check-in or location-tagged status update represents an event attendee (either a local or non-local attendee).

Social network public postings from previous events. Information regarding the social network public postings from previous events may be received from the user activity information server 220 and/or previously stored by attendee origin and impact determination server 210. The information regarding the social network public postings from previous events may indicate the number of attendees and their origins who previously attended a similar event as an upcoming event. In embodiments, the public postings may be public messages, and may also include pictures or videos. The pictures or videos may be analyzed to determine that the picture or video was of an event. In embodiments, only one public posting or check-in per user may be counted so that multiple postings and check-ins from the same user do not skew the data indicating the number of attendees, and origins of the attendees, attending the event.

Traveling distance/radius of attendees who attended a previous similar event. For example, information from the user activity information server 220, the event information server 215, and/or information previously stored by attendee origin and impact determination server 210 may identify the distance that attendees traveled when attending a previous similar event. As an example, a particular musical group may have historically attracted attendees from a relatively large radius from the location of a concert event, whereas a different musical group may have historically attracted attendees from a relatively smaller radius from the location of a concert event.

The historical event attendee origin indicators may include additional information not identified above.

The historical attendee origin impact information indicates the impact that attendees from various origins had on the local infrastructure/economy in which an event took place (e.g., a previous event similar to an upcoming event). In embodiments, the historical attendee origin impact information may include information identifying products/services that attendees from different origins consumed. In embodiments, the historical attendee origin impact information may indicate how the local infrastructure/economy was impacted based on the number of attendees from various origins (e.g., the number of non-local attendees, or the number of attendees outside of a particular radius of the location of the event). For example, the historical attendee origin impact information may indicate sales volumes for restaurants, tourist attractions, and/or hotels. Additionally, or alternatively, the historical attendee origin impact information may indicate the usage volume of public facilities in relation to the number of non-local attendees (e.g., public roads, trains, etc.).

Based on receiving the pre-event attendee origin indicators and the historical event attendee origin indicators, the attendee origin and impact determination server 210 may determine (e.g., predict) the origin of attendees attending a particular event, as described above. The attendee origin and impact determination server 210 may further analyze the impact (e.g., to a local infrastructure or economy) based on the origins of the attendees and the historical impact information. For example, the attendee origin and impact determination server 210 may determine that particular restaurants may experience an increase in volume based on a large number of attendees from a particular origin who have historically patronized those restaurants when attending an event. As an example, the attendee origin impact indicators may show that when a large number of attendees from region A attend an event, restaurant B has historically experienced higher volume. Based on this determination, the attendee origin and impact determination server 210 may send a report to those restaurants indicating the higher volume, and the extent of the higher volume. Restaurant management personnel may then use this information to better accommodate the increased number of guests that are planning on attending the event. In embodiments, restaurant management may send promotions to attendees planning on attending events. For example, the impact may identify marketing opportunities for businesses to market their products/services to potential customers (e.g., attendees for the event).

Further, the attendee origin and impact determination server 210 may determine that hotels are likely to experience an increase in volume since a particular number of attendees are from non-local origins (e.g., origins greater than a threshold distance from the event in which overnight lodging may be required). Based on this determination, the attendee origin and impact determination server 210 may send a report to those hotels indicating the higher volume, and the extent of the higher volume. Hotel management personnel may then use this information to better accommodate the increased number of guests that are planning on attending the event and use hotel lodging. In embodiments, hotel management may send promotions to attendees planning on attending events. Additionally, or alternatively, promotions may be provided at the location where an event is taking place.

Additionally, or alternatively, the attendee origin and impact determination server 210 may determine that particular roadways or trains are likely to experience an increase in volume since a particular number of attendees are from origins that require the use of these roadways or trains to attend the event. Based on this determination, the attendee origin and impact determination server 210 may send a report to transit planners indicating the higher volume, and the extent of the higher volume. The transit planners personnel may then use this information to better accommodate the increased number of guests that are planning on attending the event and use the roadways and trains.

Figure 4:
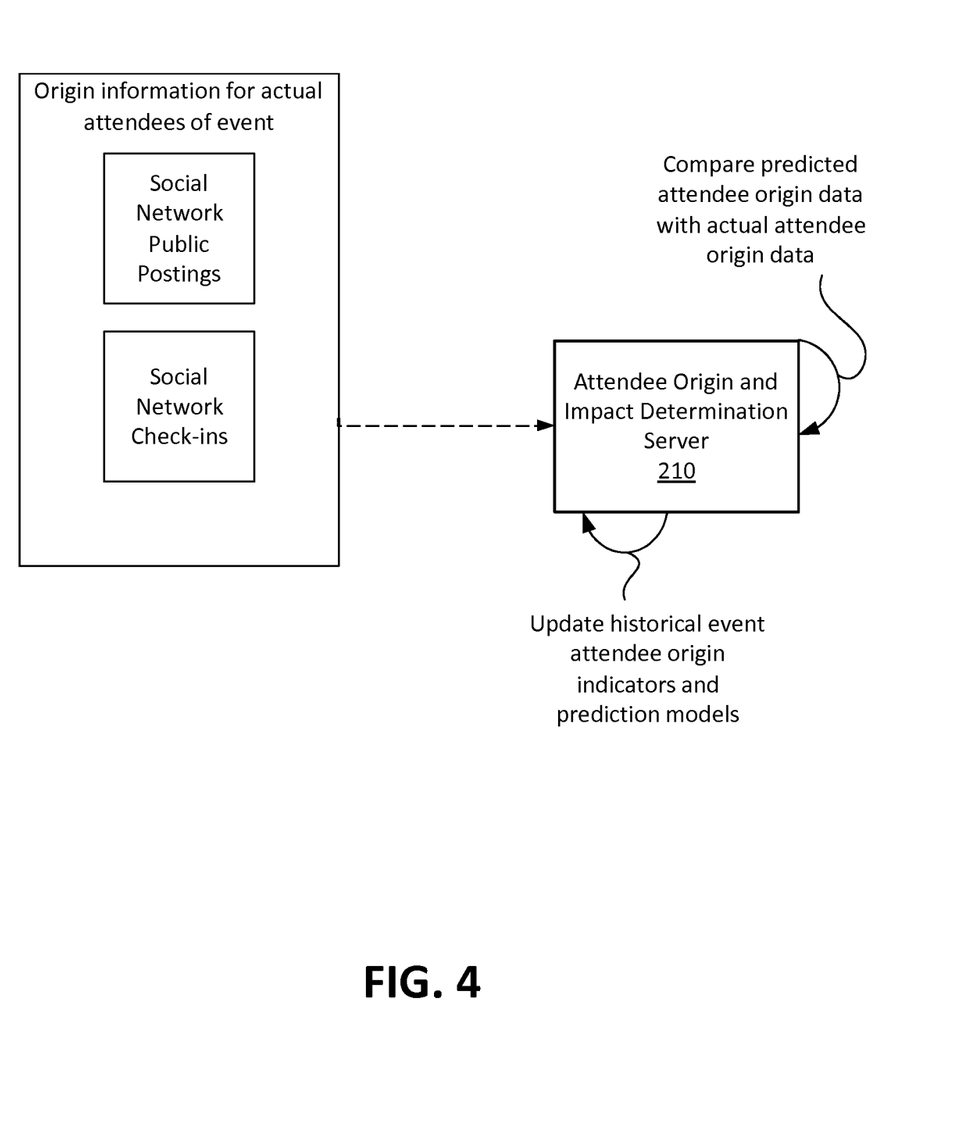
FIG. 4 shows a flow diagram of an example process for updating attendee prediction models by comparing the origin of attendees who actually attended an event with the predicted origin of attendees.

FIG. 4 shows a flow diagram of an example process for updating attendee prediction models by comparing the origin of attendees who actually attended an event with the predicted origin of attendees. As shown in FIG. 4, the attendee origin and impact determination server 210 may receive origin information for actual attendees of an event. For example, the origin information for the actual attendees may include:

Social network public postings relating to the event. The social network public postings may be received from the user activity information server 220, and may identify individuals who attended the event (e.g., based on the content of the postings, such as texts, pictures, videos, etc.).

Social network check-ins for the event. Information regarding the social network check-ins the event may be received from the user activity information server 220, and may indicate the number of attendees and their origins who attended the event. In embodiments, only one check-in per user may be counted so that multiple check-ins from the same user do not skew the data indicating the number of attendees, and origins of the attendees, who attended the event.

The origin information for actual attendee of the event may include additional information not identified above.

Based on receiving the origin information for actual attendees of the event the attendee origin and impact determination server 210 may compare the predicted attendee origin information (e.g., as previously determined as discussed above with respect to FIG. 3), with the actual attendee origin information. The attendee origin and impact determination server 210 may also store information regarding the actual attendee information to predict the origin of attendees for future similar events. Further, the attendee origin and impact determination server 210 may update confidence score and prediction models used to predict the attendee origins (e.g., to increase the accuracy and reliability of future predictions of attendee origins).

FIG. 5 shows an example flowchart for generating an attendee origin prediction report. The steps of FIG. 5 may be implemented in the environment of FIG. 1 and FIG. 2, for example. As noted above, the flowchart illustrates the architecture, functionality, and operation of possible implementations of systems, methods, and computer program products according to various embodiments of the present invention.

At step 505, attendee origin indicators are obtained. For example, the attendee origin and impact determination server 210 may obtain pre-event attendee origin indicators by accessing a database and/or a social media network associated with the event information server 215 and/or the user activity information server 220. In embodiments, the attendee origin and impact determination server 210 may obtain, from the event information server 215 and/or the user activity information server 220, ticket sales billing information, social network event responses, social network public postings, and/or other information that identifies attendees planning on attending an upcoming event. In embodiments, the attendee origin and impact determination server 210 may access (e.g., from a storage system 22B of the attendee origin and impact determination server 210), historical event attendee origin indicators, such as ticket sales billing information from previous similar events, social network check-ins from previous events, social network public postings from previous events, etc.

At step 510, attendee origin impact indicators are obtained. For example, the attendee origin and impact determination server 210 may obtain the attendee origin impact indicators from a storage system 22B of the attendee origin and impact determination server 210. The attendee origin impact indicators may indicate how the local infrastructure/economy was impacted based on the number of attendees from various origins (e.g., the number of non-local attendees, or the number of attendees outside of a particular radius of the location of the event). For example, the historical impact information may indicate sales volumes for restaurants, tourist attractions, and/or hotels. Additionally, or alternatively, the historical impact information may indicate the usage volume of public facilities in relation to the number of non-local attendees (e.g., public roads, trains, etc.).

At step 515, an attendee origin prediction report is generated. For example, the attendee origin and impact determination server 210 may generate the origin prediction report based on the attendee origin indicators. In embodiments, the attendee origin and impact determination server 210 may analyze the attendee origin indicators to identify the number of total attendees planning on attending an event, and classify the attendees as local or non-local based on the origins of the attendees.

The attendee origin and impact determination server 210 may count the number of local and non-local attendees, and may further subdivide or further classify non-local attendees into regions. For example, the attendee origin and impact determination server 210 may count the number of ticket sales for the event, and determine the number of local non-local attendees based on the billing information for the ticket sales.

In embodiments, the attendee origin and impact determination server 210 may count the number of event responses on a social networking system to determine the number of attendees and their origins. In embodiments, a response is counted only once per user to prevent multiple responses from the same user from being counted more than once. In embodiments, reports can be generated in real time and be updated as additional data is received (e.g., additional social media posts, ticket sales information, etc.). In embodiments, a response can be updated when a user initially indicates plans to attend an event, but later indicates that the user is no longer on planning to attend the event. In embodiments, the attendee origin and impact determination server 210 may count the number of public postings indicating users' plans to attend and event. In embodiments, public postings indicating a user's plans on attending an event may only be counted once. The origin of the users who responded to event invitations and posted their intentions to attend an event may be determined based on published location information for the users (e.g., the user's hometown or city of residence).

In embodiments, the attendee origin and impact determination server 210 may predict whether a user is planning on attending an event based on text posted by the user via a social network and/or based on other information associated with the user (e.g., the user's calendar events, etc.) The attendee origin and impact determination server 210 may determine a confidence score indicating the likelihood that the predicted attendee will actually attend the event. As described above, the confidence score may be based on NLP techniques in social media postings, information in a user's calendar, etc. In embodiments, the attendee origin and impact determination server 210 may only count a predicted attendee when the confidence score exceeds a threshold. Further the attendee origin and impact determination server 210 may determine the origin of the attendee (e.g., classify the attendee as local or non-local) when the confidence score exceeds the threshold. In embodiments, the confidence score for attendees that were counted based on ticket sales and/or social network event responses (e.g., responses indicating plans to attend the event) may be relatively high since ticket sales and social network event responses generally indicate a high likelihood that an individual is planning on attending an event.

In embodiments, the attendee origin and impact determination server 210 may also use the historical attendee origin information to determine the number of attendees and their origins when generating the attendee origin prediction report. For example, the attendee origin and impact determination server 210 may use information identifying ticket sales from previous similar events, social network check-ins from previous similar events, social network public postings from previous similar events, and/or other historical information from previous similar events to generate the attendee origin prediction report. In embodiments, the attendee origin prediction report may include a chart, graph, map, or the like identifying the number of attendees by origin (e.g., by region, town, zip code, range of coordinates, etc.). Further, the prediction report may include confidence scores and margin of error indicating the reliability or accuracy of the prediction.

In embodiments, the confidence scores may be determined using any known confidence scoring technique. In embodiments, the confidence scores may be initially assigned based on an estimated level of how closely the historical attendee origin indicators accurately predict the origins of attendees for upcoming events. These confidence scores are later updated based on comparing actual vs. predicted attendee origin, as described in greater detail below. As an example, a relatively high confidence score may be assigned for a given attendee when the attendee is determined to be a "non-local" attendee when the ZIP code of the attendee (e.g., based on ticket sales billing information) or the published city of the attendee (e.g., based on the attendee's published city in their social networking profile) is greater than a threshold distance from the location of the event. As another example, a relatively high confidence score may be assigned for given individual when NLP techniques indicate a high likelihood that the given individual is likely to attend an event and travel from a particular origin (e.g., based on text posted by the individual in a social networking system).

At step 520, the impact (e.g., of local infrastructure or economy) is determined based on the information in the attendee origin prediction report and the attendee origin impact indicators. For example, the attendee origin and impact determination server 210 may determine impact by combining the information in the attendee origin prediction report (e.g., the number of attendees by origin) with the attendee origin impact indicators.

As described above with respect to FIG. 3, the attendee origin and impact determination server 210 may determine that particular restaurants may experience an increase in volume based on a large number of attendees from a particular origin who have historically patronized those restaurants when attending an event. For example, the attendee origin impact indicators may show that when a large number of attendees from region A attend an event, restaurant B has historically experienced higher volume. Similarly, the attendee origin and impact determination server 210 may determine that hotels are likely to experience an increase in volume since a particular number of attendees are from non-local origins (e.g., origins greater than a threshold distance from the event in which overnight lodging may be required). Similarly, the attendee origin and impact determination server 210 may determine that particular roadways or trains are likely to experience an increase in volume since a particular number of attendees are from origins that require the use of these roadways or trains to attend the event.

At step 525, the actual origin of attendees is determined. For example, the attendee origin and impact determination server 210 may determine the number of attendees by origin that actually attended the event (e.g., based on social network check-ins, social network public postings, etc.) as described above with respect to FIG. 4.

At step 530, the number of attendees by origin that actually attended the event is compared with the predicted number of attendees by origin in the attendee origin prediction report. At step 535, the prediction techniques used to predict the number of attendees by origin are updated. Also, the historical event attendee origin indicators are updated based on the actual number of attendees by origin. The attendee origin and impact determination server 210 may also store information regarding the actual attendee information to predict the origin of attendees for future similar events. Further, the attendee origin and impact determination server 210 may update confidence score and prediction models used to predict the attendee origins (e.g., to increase the accuracy and reliability of future predictions of attendee origins).

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method for determining the origins of attendees planning to attend an event, via a network. In this case, a computer infrastructure, such as server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining, by a computing device, attendee origin indicators for an upcoming event by accessing a database or social media network;
    obtaining, by the computing device, attendee origin impact indicators;
    determining, by the computing device, a predicted number of attendees for the upcoming event by origin based on the attendee origin indicators by counting and storing in a storage system a number of event responses on the social media network, wherein only one response is counted per user of the social media network to prevent multiple responses from the same user being counted more than one time;
    determining a confidence score indicating the reliability or accuracy of the predicted number of attendees for the upcoming event by origin;
    determining, by the computing device, an impact of hosting the attendees for the upcoming event based on the predicted number of attendees by origin and the attendee origin impact indicators; and
    outputting, by the computing device, information identifying the impact,
    wherein the confidence score is determined based on a Natural Language Processing (NLP) technique,
    wherein the counting and storage of the predicted number of attendees in the storage system is only made for predicted attendees with a confidence score exceeding a threshold,
    wherein the determining an impact of hosting the attendees includes analyzing the attendee origin impact indicators to determine an impact on predetermined businesses by attendees from a particular origin based on determining types of businesses which the attendees from the particular origin have historically patronized, and
    wherein making the counting and storage of the predicted number of attendees in the storage system only for the predicted attendees with the confidence score exceeding the threshold reduces: (i) a number of counting and storage operations; and (ii) an amount of storage space required in the computing device.

2. The method of claim 1, wherein the attendee origin indicators include at least one of:
    ticket sales billing information relating to the upcoming event;
    social network event responses relating to the upcoming event; and
    social network public postings relating to the upcoming event.

3. The method of claim 2, wherein the billing information includes billing zip codes, and wherein the predetermined businesses include at least one from a group consisting of: restaurants; hotels; and transportation businesses.

4. The method of claim 1, wherein the attendee origin indicators include at least one of:
    social network check-ins relating to previous events similar to the upcoming event;
    ticket sales billing information relating to previous events similar to the upcoming event;
    social network event responses relating to previous events similar to the upcoming event; and
    social network public postings relating to previous events similar to the upcoming event.

5. The method of claim 1, wherein the origin impact indicators identify a volume of products, services, or infrastructure utilized by attendees of different origins when attending a similar event as the upcoming event.

6. The method of claim 1, wherein the outputting includes outputting the information identifying the impact to planning personnel of a business or infrastructure impacted by the hosting of the attendees.

7. The method of claim 1, further comprising:
    determining the origin of attendees who actually attended the event;
    comparing information identifying the origin of attendees who actually attended the event with the predicted number of attendees by origin;
    updating a prediction technique used to determine the predicted number of attendees by origin based on comparing the information identifying the origin of attendees who actually attended the event with the predicted number of attendees by origin;
    storing the information identifying the origin of attendees who actually attended the event to predict the origin of attendees for future similar events; and
    determining a confidence score for the predicted number of attendees by origin, wherein the outputting includes outputting the confidence score and the predicted number of attendees by origin,
    wherein the origin impact indicators identify a volume of products, services, or infrastructure utilized by attendees of different origins when attending a similar event as the upcoming event,
    wherein the outputting includes outputting the information identifying the impact to planning personnel of a business or infrastructure impacted by the hosting of the attendees,
    wherein the attendee origin indicators include at least one of ticket sales billing information relating to the upcoming event,
    wherein the billing information includes billing zip codes,
    wherein the predetermined businesses include at least one from a group consisting of: restaurants; hotels; and transportation businesses, and wherein the impact relates to an impact to local infrastructure or a local economy associated with a location of the upcoming event.

8. The method of claim 1, further comprising: determining a confidence score for the predicted number of attendees by origin, wherein the outputting includes outputting the confidence score and the predicted number of attendees by origin.

9. The method of claim 1, wherein the impact relates to an impact to local infrastructure or a local economy associated with a location of the upcoming event.

10. The method of claim 1, wherein a service provider at least one of creates, maintains, deploys and supports the computing device.

11. The method of claim 1, wherein steps of claim 1 are provided by a service provider on a subscription, advertising, and/or fee basis.

12. The method of claim 1, further comprising deploying a system for determining the impact to a local infrastructure or economy, comprising providing a computer infrastructure operable to perform the steps of claim 1.

13. A computer program product for determining the impact to a local infrastructure or economy when hosting an event, the computer program product comprising a computer readable storage medium having program instructions embodied therewith, the program instructions executable by a computing device to cause the computing device to:
obtain attendee origin indicators for an upcoming event by accessing a database or social media network, the attendee origin indicators identifying the origin of attendees who previously attended a similar event as the upcoming event;
obtain attendee origin impact indicators indicating the impact that attendees of various origins had on the local infrastructure or economy;
determine a predicted number of attendees for the upcoming event by origin based on the attendee origin indicators by counting and storing in a storage system a number of event responses on the social media network, wherein only one response is counted per user of the social media network to prevent multiple responses from the same user being counted more than one time;
determine a confidence score indicating the reliability or accuracy of the predicted number of attendees for the upcoming event by origin;
determine an impact of hosting the attendees for the upcoming event based on the predicted number of attendees by origin and the attendee origin impact indicators; and
output information identifying the impact and the predicted number of attendees for the upcoming event by origin,
wherein the confidence score is determined based on a Natural Language Processing (NLP) technique,
wherein the counting and storage of the predicted number of attendees in the storage system is only made for predicted attendees with a confidence score exceeding a threshold,
wherein the determining an impact of hosting the attendees includes analyzing the attendee origin impact indicators to determine an impact on predetermined businesses by attendees from a particular origin based on determining types of businesses which the attendees from the particular origin have historically patronized, and
wherein making the counting and storage of the predicted number of attendees in the storage system only for the predicted attendees with the confidence score exceeding the threshold reduces: (i) a number of counting and storage operations; and (ii) an amount of storage space required in the computing device.

14. The computer program product of claim 13, wherein the attendee origin indicators include at least one of:
social network check-ins relating to previous events similar to the upcoming event;
ticket sales billing information relating to previous events similar to the upcoming event;
social network event responses relating to previous events similar to the upcoming event; and
social network public postings relating to previous events similar to the upcoming event.

15. The computer program product of claim 13, wherein the origin impact indicators identify a volume of products, services, or infrastructure utilized by attendees of different origins when attending a similar event as the upcoming event.

16. The computer program product of claim 13, wherein the program instructions to output the information identifying the impact and the predicted number of attendees causes the computing device to output the information identifying the impact and the predicted number of attendees to planning personnel of a business or infrastructure impacted by the hosting of the attendees.

17. The computer program product of claim 13, wherein the program instructions further cause the computing device to:
determine the origin of attendees who actually attended the event;
compare information identifying the origin of attendees who actually attended the event with the predicted number of attendees by origin; and
update a prediction technique used to determine the predicted number of attendees by origin based on comparing the information identifying the origin of attendees who actually attended the event with the predicted number of attendees by origin.

18. The computer program product of claim 13, wherein the impact relates to an impact to local infrastructure or a local economy associated with a location of the upcoming event, and wherein the predetermined businesses include at least one from a group consisting of restaurants; hotels; and transportation businesses.

19. A system comprising:
a CPU, a computer readable memory and a computer readable storage medium associated with a computing device;
program instructions to obtain attendee origin indicators for an upcoming event by accessing a social media network;
program instructions to obtain attendee origin impact indicators;
program instructions to determine a predicted number of attendees for the upcoming event by origin based on the attendee origin indicators;
program instructions to determine a confidence score indicating the reliability or accuracy of the predicted number of attendees for the upcoming event by origin;
program instructions to determine an impact to a local economy or infrastructure of hosting the attendees for the upcoming event based on the predicted number of attendees by origin and the attendee origin impact indicators;

program instructions to output information identifying the impact to planning personnel of impacted business or infrastructure, wherein the confidence score is determined based on a Natural Language Processing (NLP) technique in at least one selected from a group consisting of: social media postings; and users' calendars, wherein a count and storage of the predicted number of attendees in the storage system is only made for predicted attendees with a confidence score exceeding a threshold, wherein the program instructions are stored on the computer readable storage medium for execution by the CPU via the computer readable memory, wherein the determining an impact of hosting the attendees includes analyzing the attendee origin impact indicators to determine an impact on predetermined businesses of the local economy by attendees from a particular origin based on determining types of businesses which the attendees from the particular origin have historically patronized, and wherein making the counting and storage of the predicted number of attendees in the storage system only for the predicted attendees with the confidence score exceeding the threshold reduces: (i) a number of counting and storage operations; and (ii) an amount of storage space required in the computing device.

20. The system of claim 19, further comprising:

program instructions to generate a report identifying the predicted number of attendees for the upcoming event by origin and the confidence scores, wherein the program instructions to output the information include program instructions to output the report;

program instructions to determine the origin of attendees who actually attended the event;

program instructions to compare information identifying the origin of attendees who actually attended the event with the predicted number of attendees by origin;

program instructions to update a prediction technique used to determine the predicted number of attendees by origin based on comparing the information identifying the origin of attendees who actually attended the event with the predicted number of attendees by origin; and program instructions to store the information identifying the origin of attendees who actually attended the event to predict the origin of attendees for future similar events, wherein the attendee origin indicators include at least one of: ticket sales billing information relating to the upcoming event; social network event responses relating to the upcoming event; and social network public postings relating to the upcoming event, wherein the billing information includes billing zip codes, wherein the predetermined businesses include at least one from a group consisting of: restaurants; hotels; and transportation businesses, and wherein the attendee origin impact indicators identify a volume of products, services, or infrastructure utilized by attendees of different origins when attending a similar event as the upcoming event.

* * * * *